United States Patent
Jain et al.

(10) Patent No.: US 9,582,435 B2
(45) Date of Patent: Feb. 28, 2017

(54) MEMORY SYSTEM AND METHOD FOR EFFICIENT PADDING OF MEMORY PAGES

(71) Applicant: SanDisk Technologies Inc., Plano, TX (US)

(72) Inventors: Vimal Jain, Bangalore (IN); Abhijeet Manohar, Bangalore (IN); Aaron Lee, Mountain View, CA (US); Anne Pao-Ling Koh, Fremont, CA (US)

(73) Assignee: SanDisk Technologies LLC, Plano, TX (US)

( * ) Notice: Subject to any disclaimer, the term of this patent is extended or adjusted under 35 U.S.C. 154(b) by 53 days.

(21) Appl. No.: 14/665,893

(22) Filed: Mar. 23, 2015

(65) Prior Publication Data

US 2016/0283110 A1    Sep. 29, 2016

(51) Int. Cl.
| | |
|---|---|
| G06F 13/00 | (2006.01) |
| G06F 13/16 | (2006.01) |
| G06F 12/14 | (2006.01) |
| G06F 3/06 | (2006.01) |

(52) U.S. Cl.
CPC .......... G06F 13/00 (2013.01); G06F 13/1668 (2013.01); *G06F 3/064* (2013.01); *G06F 12/14* (2013.01); *G06F 12/1408* (2013.01)

(58) Field of Classification Search
CPC ....... G06F 3/064; G06F 12/14; G06F 12/1408
USPC ........................................... 711/103
See application file for complete search history.

(56) References Cited

U.S. PATENT DOCUMENTS

| | | | |
|---|---|---|---|
| 2005/0129243 A1* | 6/2005 | Bousis | H04L 9/0637 380/277 |
| 2005/0264319 A1* | 12/2005 | Kucharski | H03K 3/2885 326/68 |
| 2006/0136875 A1* | 6/2006 | Thorpe | G06F 21/16 717/122 |
| 2009/0323942 A1* | 12/2009 | Sharon | G11C 7/1006 380/44 |

\* cited by examiner

*Primary Examiner* — Charles Rones
*Assistant Examiner* — Sidney Li
(74) *Attorney, Agent, or Firm* — Brinks Gilson & Lione

(57) ABSTRACT

In one embodiment, a memory system is provided comprising a memory die and a controller. The memory die comprises a non-volatile memory, a data latch, and an on-chip randomizer. The controller is configured to send a command to the memory die to cause the on-chip randomizer to store random data in the data latch and send data to the memory die to overwrite some, but not all, of the random data in the data latch, wherein the memory die is configured to transfer the data and random data stored in the data latch to the non-volatile memory. Other embodiments are provided.

17 Claims, 6 Drawing Sheets

MEMORY SYSTEM AND METHOD FOR EFFICIENT PADDING OF MEMORY PAGES

BACKGROUND

In many memory systems, data is written to the memory in a page. However, there are many instances in which less than a page worth of data is desired to be written. For example, in flash firmware, while control block page writes are page aligned to maximize performance, the control data (e.g., a master index page) within the page may not be. As another example, firmware state/data structures are often accumulated and saved into non-volatile memory at regular time intervals or in response to certain events. However, at the time the save occurs, there may be less than a page worth of firmware state/data structures. As yet another example, during garbage collection, more than one source block can be moved to one destination block, and one source can be mixed with another source block data in same page. It can be a complex task to recover data in case of errors such as program failures or ECC errors. To simplify such cases, two source blocks of data can be mixed in the same page, with the result sometimes being less that a page worth of data. Additionally, file system writes are usually page aligned, but file sizes are not necessarily aligned with the page size.

In situations where data desired to be written is less than a page worth of data or when the data is not aligned with a page, the controller of the memory system can store the data in a buffer (e.g., RAM) and then "pad" the data to create a full page. For example, the controller can first read adjacent data from the non-volatile memory and then appropriately pad and re-write the new data. As another example, the controller can add "dummy data" to pad the rest of the buffer to create a full page. The page worth of data, which includes the data desired to be written and the padded data, is then sent to the memory die for storage in non-volatile memory.

DETAILED DESCRIPTION OF THE PRESENTLY PREFERRED EMBODIMENTS

Overview

Figure 1A:
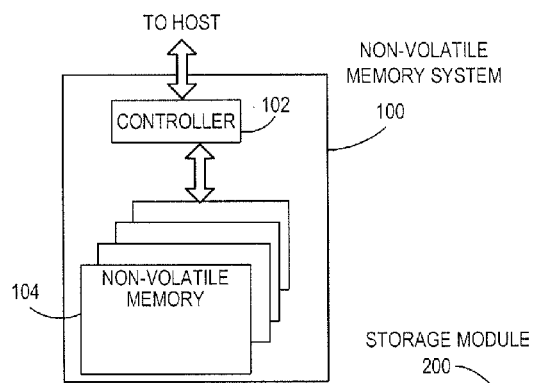
FIG. 1A is a block diagram of a non-volatile memory system of an embodiment.

Embodiments of the present invention are defined by the claims, and nothing in this section should be taken as a limitation on those claims.

By way of introduction, the below embodiments relate to a memory system and method for efficient padding of memory pages. In one embodiment, a memory system is provided comprising a memory die and a controller. The memory die comprises a non-volatile memory, a data latch, and an on-chip randomizer. The controller is configured to send a command to the memory die to cause the on-chip randomizer to store random data in the data latch and send data to the memory die to overwrite some, but not all, of the random data in the data latch, wherein the memory die is configured to transfer the data and random data stored in the data latch to the non-volatile memory.

In another embodiment, a method for storing data in a memory die is provided, which is performed in a memory die comprising a data latch and non-volatile memory. The memory die stores random data in the data latch, receives data be stored in the data latch, wherein an amount of data received is less than a capacity of the data latch, stores the data in the data latch, and transfers the data and random data stored in the data latch to the non-volatile memory.

In yet another embodiment, a method for storing less than a page of data in a memory die is provided, which is performed in a controller in communication with a memory die comprising a non-volatile memory, a data latch configured to store a page of data, and a randomizer. The controller stores data in a volatile memory, wherein the data is less than a page. Instead of padding the data in the volatile memory to create a full page, the controller sends a command to the memory die to cause the randomizer to store a page of random data in the data latch and sends the data from the volatile memory to the memory die to overwrite some, but not all, of the random data in the data latch.

In some embodiments, the data latch is large enough to store a page of data, and the data sent to the memory die is less than a page of data. In some embodiments, a scramble seed is sent to the memory die.

In some embodiments, the non-volatile memory of the memory die is a three-dimensional memory. In some embodiments, the memory die is embedded in a host, while, in other embodiments, the memory die is part of a memory system that is removably connected to a host.

Other embodiments are possible, and each of the embodiments can be used alone or together in combination. Accordingly, various embodiments will now be described with reference to the attached drawings.

Exemplary Embodiments

As mentioned in the background section above, in situations where data desired to be written is less than a page worth of data or when the data is not aligned with a page, the controller of the memory system can store the data in a buffer (e.g., RAM) and then "pad" the data to create a full page. For example, the controller can first read adjacent data from the non-volatile memory and then appropriately pad and re-write the new data. However, the process of reading before writing increases the number of reads into the non-volatile memory and can decrease its endurance, as well as result in inferior performance. As another example, the controller can add "dummy data" to pad the rest of the buffer to create a full page. The page worth of data, which includes the data desired to be written and the padded data, is then sent to the memory die for storage in non-volatile memory. However, this approach requires the controller to find the misalignment and create the dummy segments in RAM before and after the intended data, which creates unnecessary computations in firmware and is required in every unaligned write. Accordingly, these current approaches are not optimal and may impact firmware complexity and performance.

The following embodiments can be used to address these problems by utilizing a random data feature supported by some current memory dies. This provides a method of padding that does not require complex handling by memory system firmware and, at the same time, does not hamper performance for dummy data handling. These embodiments can be used for any kind of data (not just the data discussed in the background section). In other words, these embodiments are "data agnostic." Before turning to these and other embodiments, the following paragraphs provide a discussion of exemplary memory systems that can be used with these embodiments. Of course, these are just examples, and other suitable types of memory systems can be used.

Figure 1B:
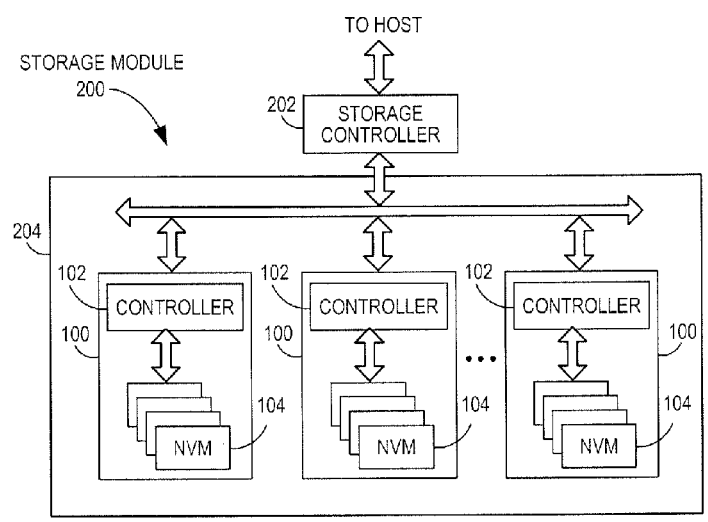
FIG. 1B is a block diagram illustrating an exemplary storage module of an embodiment.
Figure 1C:
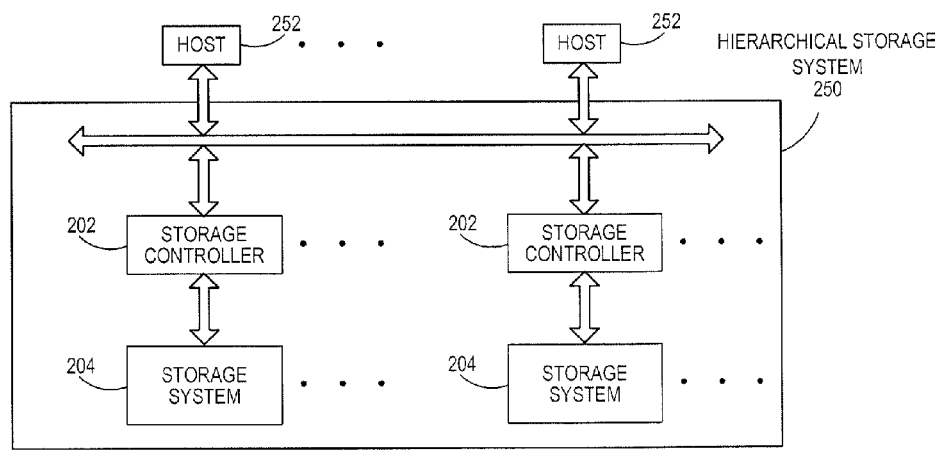
FIG. 1C is a block diagram illustrating a hierarchical storage system of an embodiment.

Memory systems suitable for use in implementing aspects of these embodiments are shown in FIGS. 1A-1C. FIG. 1A is a block diagram illustrating a non-volatile memory system according to an embodiment of the subject matter described herein. Referring to FIG. 1A, non-volatile memory system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although, in the example illustrated in FIG. 1A, non-volatile memory system 100 (sometimes referred to herein as a storage module) includes a single channel between controller 102 and non-volatile memory die 104, the subject matter described herein is not limited to having a single memory channel. For example, in some NAND memory system architectures (such as the ones shown in FIGS. 1B and 1C), 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be an NVMe or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
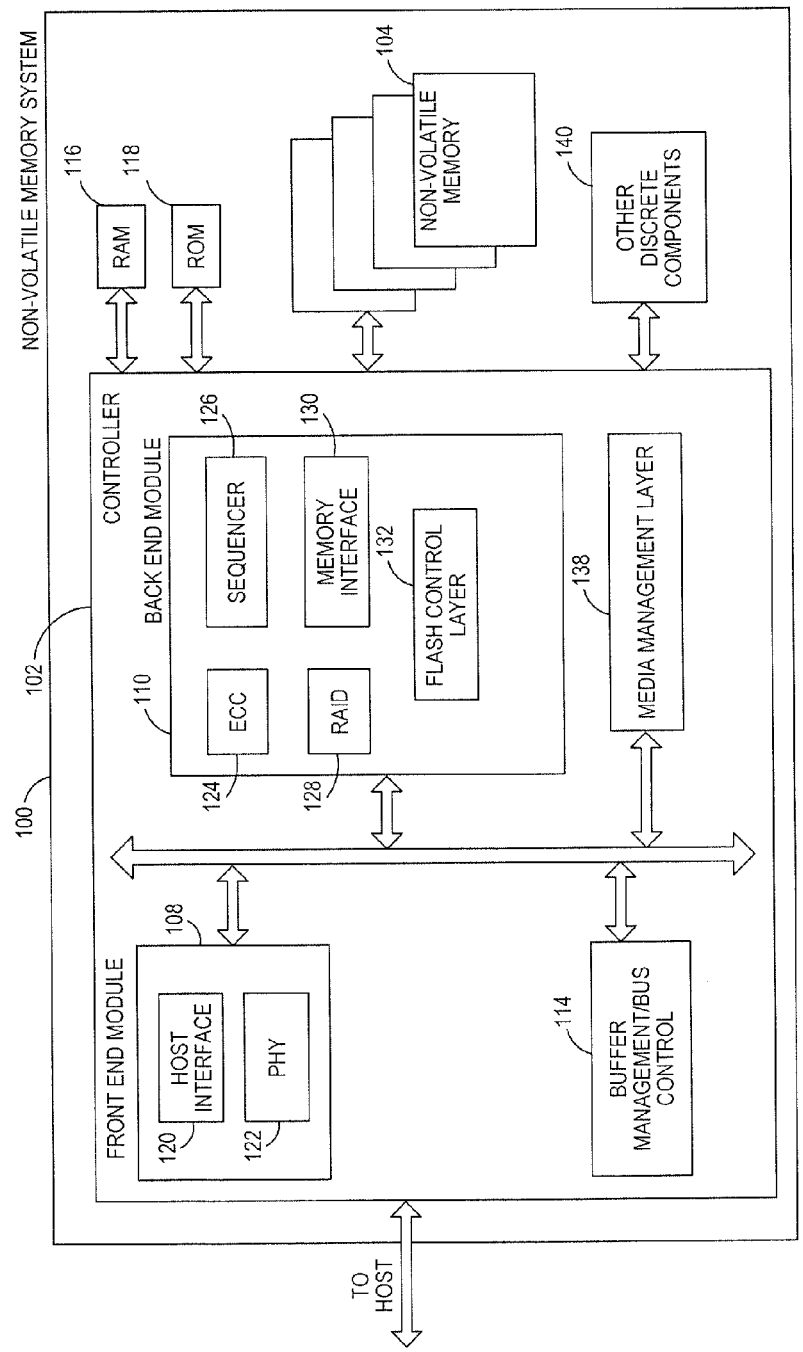
FIG. 2A is a block diagram illustrating exemplary components of the controller of the non-volatile memory system illustrated in FIG. 1A according to an embodiment.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform other functions. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include media management layer 138, which performs wear leveling of memory cells of non-volatile memory die 104. System 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
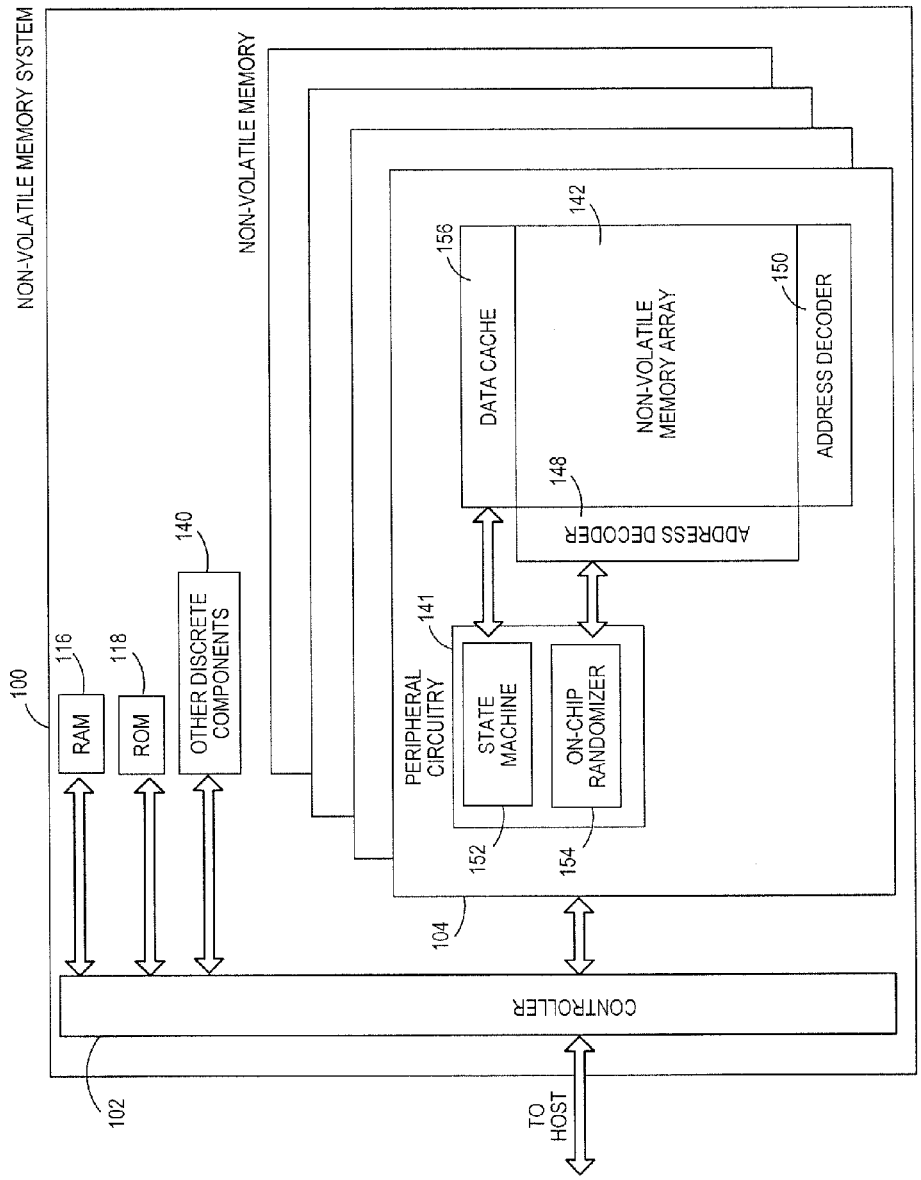
FIG. 2B is a block diagram illustrating exemplary components of the non-volatile memory of the non-volatile memory storage system illustrated in FIG. 1A according to an embodiment.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. In one embodiment, the peripheral circuitry 141 also includes an on-chip randomizer 154 configured to generate and store data in a data latch in the memory die. The on-chip randomizer 154 will be discussed in more detail below. Non-volatile memory die 104 further includes a data cache 156 that caches data.

Figure 3:
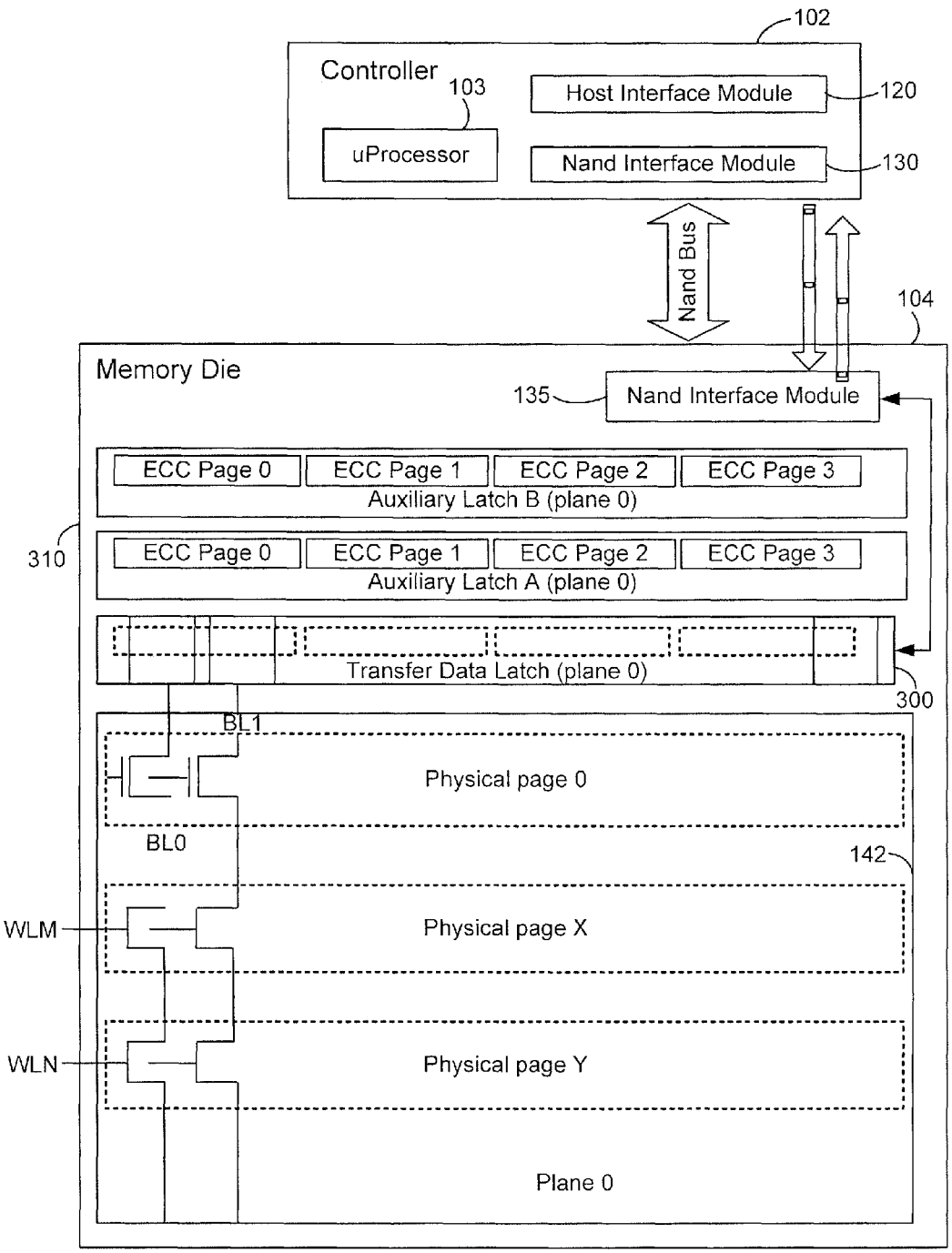
FIG. 3 is an illustration of a memory die and controller of an embodiment.

FIG. 3 is a diagram that illustrates the use of the data cache 156 in more detail. As shown in FIG. 3, the data cache 156 in this embodiment comprises a transfer data latch 300 (sometimes referred to as a "first data latch") used to transfer data between the controller 102 (using the NAND interface modules 130, 135) and the memory die 104 and at least one auxiliary data latch (sometimes referred to as a "second data latch") used to store data to be written to or read from the non-volatile memory 142, which is organized in physical pages. In the following examples, the term "data latch" can refer to either the transfer data latch or the auxiliary latch.

During a write operation, the controller 102 sends a page of data to the memory die 104 via the interface modules 130, 135. The memory die 104 stores the page of data in the transfer data latch 300 and then transfers the page of data from the transfer data latch 300 to a physical page in the non-volatile memory 142. (Optionally, the memory die 104 may temporarily store the page of data in the auxiliary data latch 310 before transferring the page of data to the non-volatile memory 142.)

As mentioned above, there are many instances in which less than a page worth of data is desired to be written. For example, in flash firmware, while control block page writes are page aligned to maximize performance, the control data (e.g., a master index page) within the page may not be. As another example, firmware state/data structures are often accumulated saved into non-volatile memory at regular time intervals or in response to certain events. However, at the time the save occurs, there may be less than a page worth of firmware state/data structures. As yet another example, during garbage collection, more than one source block can be moved to one destination block, and one source can be mixed with another source block data in same page. It can be a complex task to recover data in case of errors such as program failures or ECC errors. To simplify such cases, two source blocks of data can be mixed in the same page, with the result sometimes being less that a page worth of data. Additionally, file system writes are usually page aligned, but file sizes are not necessarily aligned with the page size.

In situations where data desired to be written is less than a page worth of data or when the data is not aligned with a page, the controller of the memory system can store the data in a buffer (e.g., RAM) and then "pad" the data to create a full page. For example, the controller can first read adjacent data from the non-volatile memory and then appropriately pad and re-write the new data. As another example, the controller can add "dummy data" to pad the rest of the buffer to create a full page. The page worth of data, which includes the data desired to be written and the padded data, is then sent to the memory die for storage in non-volatile memory. However, this approach requires the controller to find the misalignment and create the dummy segments in RAM before and after the intended data, which creates unnecessary computations in firmware and is required in every unaligned write. According, these current approaches are not optimal and may impact firmware complexity and performance.

The following embodiments can be used to address these problems by utilizing a random data feature supported by some current memory dies using an On-Chip Randomizer (OCR). The provides a method of padding that does not require complex handling by memory system firmware and, at the same time, does not hamper performance for dummy data handling. This embodiment will now be discussed in conjunction with FIGS. 4 and 5.

Figure 4:
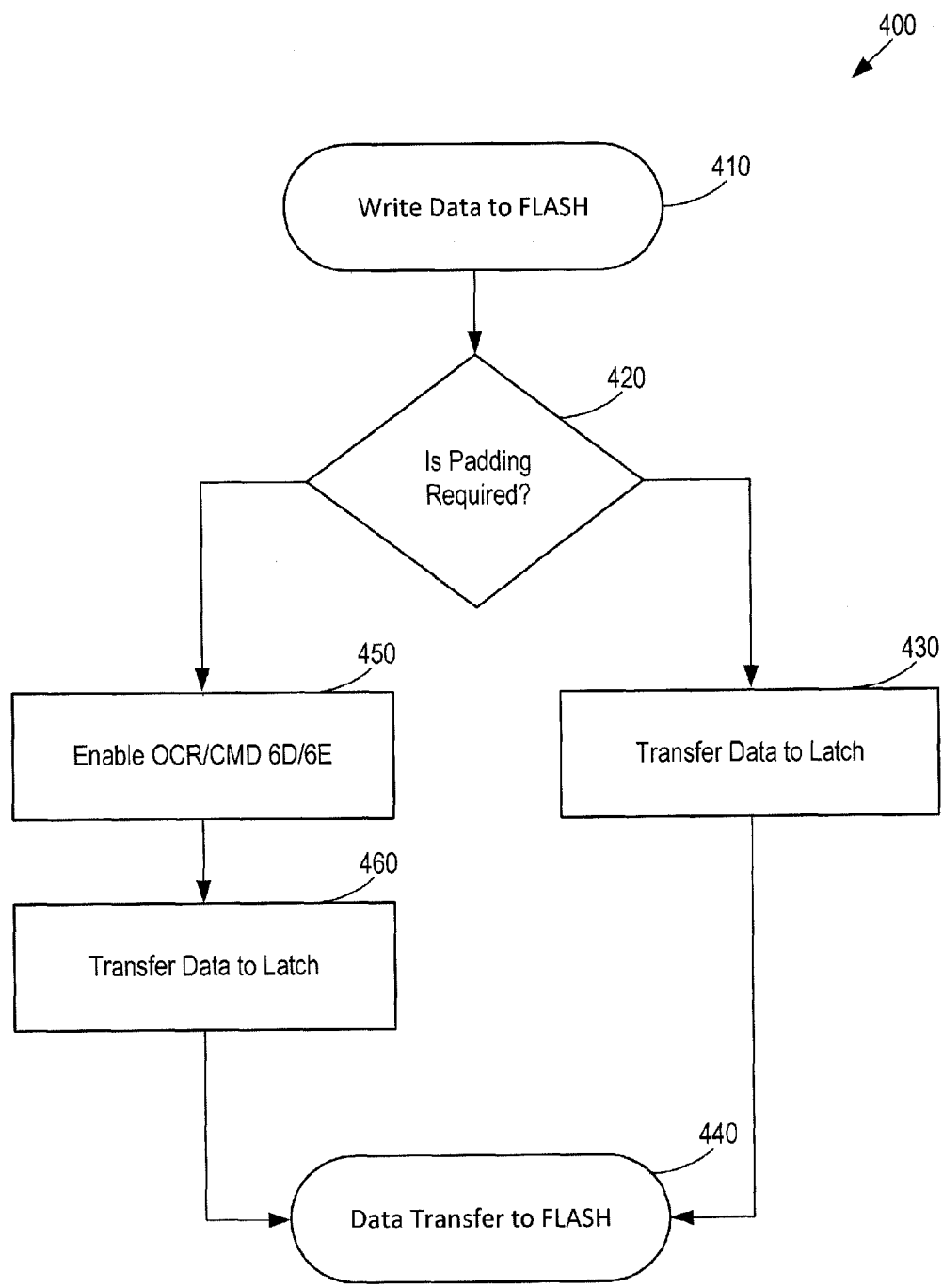
FIG. 4 is a flow chart of an embodiment for padding pages.
Figure 5:
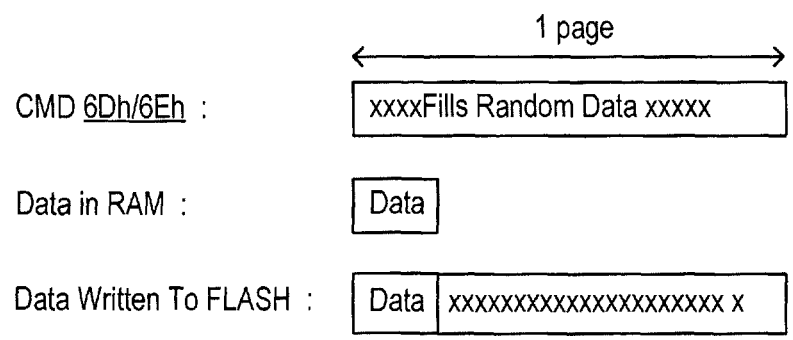
FIG. 5 is an illustration of padding pages of an embodiment.

FIG. 4 is a flow chart 400 of a method of an embodiment. As shown in FIG. 4, the controller 102 sends data to be written to the memory die 104 (here, a flash memory die) (act 410). It is then determined if padding is required (i.e., if the data to be stored is a full page of data) (act 420). If the data is a full page of data, the data is stored in the transfer data latch 300 (act 430) and then transferred to the non-volatile (flash) memory 142 (act 440). This is because the data latch 300 is large enough to store a page of data, and a page of data is being sent from the controller 102. However, if the data is less than a page of data (i.e., the data would fill less than the entire capacity of the data latch 300), the controller 102 sends a command to the memory die 104 to cause the on-chip randomizer 154 to store random data in the data latch 300 (act 450). In one embodiment, the command has the following syntax: OCR/CMD 6D/6E. Of course, other syntaxes can be used. The controller 102 can also send a scramble seed to the memory die 104 for use in generating the random data. For example, the seed can be program-address based or can be a random seed. Then, the data sent from the controller 102 is transferred to the data latch 300, so that the data from the controller 102 overwrites some, but not all (because the data is less than a page), of the random data in the data latch 300 (act 460). The full page of data in the latch 300 (which has both valid data and random data) is transferred to the non-volatile (flash) memory 142 (act 440). These acts are illustrated in FIG. 5.

As can be seen by this example, in this embodiment, when the controller 102 needs to send less than a page of data to the memory die 104, instead of padding the data in volatile memory (e.g., RAM 116) to create a full page, the controller 102 sends a command to the memory die 104 to cause the randomizer 154 to store a page of random (dummy) data in the data latch 300. In this way, the controller 102 is able to send the partial page of data from the volatile memory (e.g., RAM 116) to the memory die 104 to overwrite some, but not all, of the random data in the data latch 300. The result is that regardless of the length of user data, the entire data buffer will have random data, and a flash memory page can be programmed completely. In this way, this embodiment eliminates the need for firmware to do explicit padding.

There are several advantages associated with these embodiments. For example, these embodiments do not require firmware to explicitly create dummy data or perform alignment calculation. These embodiments also keep the page align/padding transparent to the firmware. They also eliminate the need for transferring unnecessary (dummy) data from the controller to the data latches in the memory die. For example, if the NAND page size is 16 KB, and the minimum addressable chunk is 4 KB, there would be up to 12 KB of dummy data. These embodiments save the up to 12 KB data transfer time from the RAM to the non-volatile memory every page write. With less data transfer, this self-padding feature also boosts performance. Also, since the pattern written to the non-volatile memory is truly random, these embodiments help improve endurance and reduce the change of possible wordline disturbs.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention.

Finally, it should be noted that any aspect of any of the preferred embodiments described herein can be used alone or in combination with one another.

What is claimed is:

1. A memory system comprising:
   a memory die comprising:
      a non-volatile memory;
      a data latch; and
      an on-chip randomizer; and
   a controller in communication with the memory die, wherein the controller is configured to:
      send a command to the memory die to cause the on-chip randomizer to store random data in the data latch; and
      send data to the memory die to overwrite some, but not all, of the random data in the data latch;
   wherein the memory die is configured to transfer, from the data latch to the non-volatile memory, the data and the random data that has not been overwritten by the data.

2. The memory system of claim 1, wherein data latch is large enough to store a page of data, and wherein the data sent to the memory die is less than a page of data.

3. The memory system of claim 1, wherein the controller is further configured to send a scramble seed to the memory die.

4. The memory system of claim 1, wherein the non-volatile memory is a three-dimensional memory.

5. The memory system of claim 1, wherein the memory system is embedded in a host.

6. The memory system of claim 1, wherein the memory system that is removably connected to a host.

7. A method for storing data in a memory die, the method comprising:
   performing the following in a memory die comprising a data latch and non-volatile memory:
      storing random data in the data latch;
      receiving data be stored in the data latch, wherein an amount of data received is less than a capacity of the data latch;
      storing the data in the data latch; and
      transferring, from the data latch to the non-volatile memory, the data and the random data that has not been overwritten by the data.

8. The method of claim 7, wherein data latch is large enough to store a page of data, and wherein the data sent to the memory die is less than a page of data.

9. The method of claim 7 further comprising receiving a scramble seed.

10. The method of claim 7, wherein the non-volatile memory is a three-dimensional memory.

11. The method of claim 7, wherein the memory die is embedded in a host.

12. The method of claim 7, wherein the memory die is part of a memory system that is removably connected to a host.

13. A method for storing less than a page of data in a memory die, the method comprising:
   performing the following in a controller in communication with a memory die comprising a non-volatile memory, a data latch configured to store a page of data, and a randomizer:
      storing data in a volatile memory, wherein the data is less than a page; and
      instead of padding the data in the volatile memory to create a full page:

sending a command to the memory die to cause the randomizer to store a page of random data in the data latch; and sending the data from the volatile memory to the memory die to overwrite some, but not all, of the random data in the data latch.

14. The method of claim 13 further comprising sending a scramble seed to the memory die.

15. The method of claim 13, wherein the non-volatile memory is a three-dimensional memory.

16. The method of claim 13, wherein the memory die is embedded in a host.

17. The method of claim 13, wherein the memory die is part of a memory system that is removably connected to a host.

* * * * *